United States Patent [19]

Matteson

[11] 4,006,085
[45] Feb. 1, 1977

[54] LIQUID TREATING APPARATUS

[76] Inventor: Orval Q. Matteson, 306 Reynolds St., Jacksonville, Ala. 36265

[22] Filed: Apr. 30, 1975

[21] Appl. No.: 573,351

[52] U.S. Cl. .............. 210/195 S; 210/197; 210/202; 210/220; 210/314

[51] Int. Cl.² ............................................. C02C 1/08

[58] Field of Search ............ 210/7, 15, 17, 63, 150, 210/151, 170, 195 M, 195 O, 197, 220, 221 R, 242 OS, 51.9, 525, 532 R, 532 S, 314, 202

[56] References Cited

UNITED STATES PATENTS

| 3,118,835 | 1/1964 | Butler et al. | 210/15 X |
|---|---|---|---|
| 3,210,053 | 10/1965 | Boester | 210/17 X |
| 3,221,889 | 12/1965 | Hirsch | 210/532 R |
| 3,234,880 | 2/1966 | Hampton | 210/195 M |
| 3,260,368 | 7/1966 | Wagner et al. | 210/220 X |
| 3,400,822 | 9/1968 | McKeown | 210/195 M |
| 3,419,146 | 12/1968 | Koulovatos | 210/195 M |
| 3,438,499 | 4/1969 | Rockers | 210/195 M |
| 3,677,409 | 7/1972 | Ferm et al. | 210/195 M |
| 3,764,011 | 10/1973 | Owens | 210/197 X |
| 3,846,291 | 11/1974 | Brucker | 210/151 X |

Primary Examiner—Frank A. Spear, Jr.
Assistant Examiner—Robert H. Spitzer

[57] ABSTRACT

Liquid treating apparatus wherein the inlet of a settling chamber communicates with the outlet of an aeration chamber. Retaining member(s) in the aeration chamber which divide it into two or more compartments are of sufficient porosity to permit the liquid to flow through at the required rate while retaining materials of a selected configuration or size. A permeable restraining member in the settling chamber separates the inlet from the outlet thereof and is of a mesh to permit liquid flow therethrough in a diffused manner. The restraining member extends above the high liquid level and terminates adjacent to the bottom of the settling chamber. An imperforate partition at the inlet end of the settling chamber carries a porous deflector which extends upwardly and inwardly in the settling chamber to restrain downward movement of liquid passing over the upper end of the partition. Sludge return conduits and suction-skimmer conduits transfer liquids and solids back from the settling chamber to the aeration chamber. Splash plates extend forwardly of the discharge end of such conduits and cause effluent to be spread into a thin sheet onto the surface of the liquid in the aeration chamber.

12 Claims, 6 Drawing Figures

LIQUID TREATING APPARATUS

BACKGROUND OF THE INVENTION

This invention relates to liquid treating apparatus and more particularly to apparatus for treating waste water, including both domestic sewage and those industrial wastes susceptible to aerobic treatment. The system is particularly suited to providing treatment to waste water which has been directly discharged from a home. These discharges have characteristics which make them more difficult to handle than are the amalgamated discharges from several homes. However, the total system is also equally applicable to handling loads of any capacity which are susceptible to the biological mode of treatment. Also, certain components of my improved system are adaptable for use to increase the operational efficiency of other types of aerobic, or of anaerobic, waste water treatment systems.

My invention is an improvement on conventional methods known as 'activated sludge' which consists of the aeration of waste water; the separation of solids and liquids at the end of the aeration period; the discharge of the liquid; and, the return of some or all of the separated solids to the aeration zone.

Some activated sludge secondary treatment systems have the aeration chamber preceded by primary settling chambers to remove much of the settleable and floatable materials. These in turn may be preceded by other devices, such as grit chambers, comminutors and the like to remove large materials or to shread materials into fine particle sizes whereby they are more accessible to bacteria and so that they will not clog the various treatment elements of the system. Accordingly, the function of the comminutor is very important to the effectiveness of prior art treatment systems. Mechanical comminutors are expensive, require physical cleaning and disposal of refuse and are subject to frequent break-down. Also, they do not affect hair and will pass many objects, such as adhesive tapes, small plastic bags, rubber articles, and the like, which in turn frequently pass into and through the aeration phase of the system. Such materials, particularly hair in large quantities, break down very slowly in all phases of the treatment system and cause problems with the various elements of the settling chambers and digesters.

In total secondary systems which employ separate primary clarifiers and digesters, the waste water is exposed to aeration for too short a time for oxidation of materials such as heavy paper, cloth, hair, grease balls, rubber and seeds. Also, these materials are now broken down in systems of the extended aeration type which usually provide 24 hours aeration. Accordingly, in both systems, these materials can pass into the settling chambers where they can interfere with proper operation of the various return sludge or skimmer devices or pass out in the effluent. Prior attempts to solve this problem has required large diameter sludge and skimmer lines.

The principal problem encountered in prior art systems, insofar as obtaining an effluent low in suspended solids and biochemical oxygen demand, is to obtain good settling in the final chamber. Major factors involved in accomplishing this are: to return the maximum amount of the micro-organisms for reseeding purposes; to achieve the maximum in bacteria age; to remove all floatables before they can be discharged; to maintain sufficient dissolved oxygen throughout the settling chamber to support not only bacteria but the higher forms of life, such as protozoa and rotifers, which prey on bacteria; and to achieve maximum quiescence so that settleable material will not be held in suspension. This need for quiescence prevents the introduction of air or oxygen in the settling chamber and requires an extensive settling or holding time. Extensive holding time increases the oxygen demand, promotes septicity and results in floating sludge. A long holding period at low dissolved oxygen conditions results in an extended period at low food levels whereby there is a dropoff of the primary bacteria which stabilize the organic material in the head end of the aeration chamber. This in turn results in a long recovery period to handle the waste encountered when the sludge is returned to the aeration thank whereby there is a loss in process efficiency.

It is necessary to maintain a high ratio of mixed liquor and suspended solids in the aeration chamber to accelerate the removal of organic materials and to reduce the susceptibility of the organisms to shock loads. This is achieved by maximizing the age and numbers of the organisms which in turn is directly related to the degree of sludge return achieved. Also, the sludge which is not returned must either be removed mechanically or allowed to go out in the effluent. Prior art means for returning sludge and skimmings, including the large diameter lines required, causes currents in the settling chamber and stirs up settled materials whereby such means are only operated intermittently. Also, the flow of liquid into the settling chamber, resulting from input into the system and from the liquid returned by the sludge and skimmer systems, in turn produces currents which keep materials on suspension. On the other hand, it is necessary to provide for frequent exchange of liquid between the aeration chamber and the settling chamber in order to provide adequate dissolved oxygen in the settling chamber to support aerobic conditions.

The need to have sufficient settling time and the need for quiescence in prior art equipment must be sacrificed somewhat to obtain at least some sludge return for reseeding purposes. Current equipment usually calls for at least 25% sludge return. Large systems are usually restricted to less than 50% sludge return. While small systems may be able to reach a limit of 200% sludge return from a cost basis, they are prevented from doing so because of the adverse effect on settling. Accordingly, process efficiency in aeration in prior art equipment is decreased, including failure to achieve nitrification, thus failure to achieve denitrification; creation of excess sludge or sludge blankets in the clarifier; poor ratio of biochemical oxygen demand and suspended solids removal; susceptibility to shock loading; a loss of uniformity in the bacteria species; and insufficient dissolved oxygen in the clarifier to support aerobic organism activities. Some components of waste water require an extensive exposure before they can become stabilized; a fraction of the synthesized cell initially is biologically inert and is not metabolized in prior art systems. Their biochemical demand is thus passed to the receiving waters or soil mantel. Furthermore, some components of waste water, such as hair, grease, seeds and the like, require an extensive exposure to aerobic organisms before they can be stabilized. Accordingly, the retention of these slow-to-stabilize components and materials as well as paper, cloth, wood and the like until completely degraded and metabolized makes them available as sources of food during low feed periods. One of the problems of small systems or systems fed intermittently is the drop in available food during periods of no flow or low flow, with corresponding changes in organisms and efficiency. The major organic loading food supply in an extended aeration system is the sludge itself. Accordingly, the heavier the mixed liquor-suspended solids in the system, the more consistent is the food supply for the organisms and the more there is available during low flow periods.

SUMMARY OF THE INVENTION

In accordance with my invention, I provide liquid treating apparatus wherein one or more retaining members are provided in the aeration chamber, each sufficiently porous to permit the liquid to flow through at the required rate while retaining materials of a selected configuration or size. Also, a permeable restraining member is provided in the settling chamber which separates the inlet from the outlet thereof and is of a mesh to permit diffused liquids to flow therethrough. An imperforate weir is provided at the entrance end of the settling chamber and carries a perforated deflector which extends upwardly and inwardly in the settling chamber to distract, restrain, and deflect the downward movement of liquids passing over the weir. Sludge return and skimmer conduits transfer solids and liquids from the settling chamber back to the aeration chamber. Splash plates extend forwardly of the discharge ends of the sludge return and skimmer conduits to cause effluent to be spread into a thin sheet onto the surface of the liquid in the aeration chamber.

DESCRIPTION OF THE DRAWINGS

Apparatus embodying features of my invention is illustrated in the accompanying drawings, forming a part of this application, in which.

Figure 1:
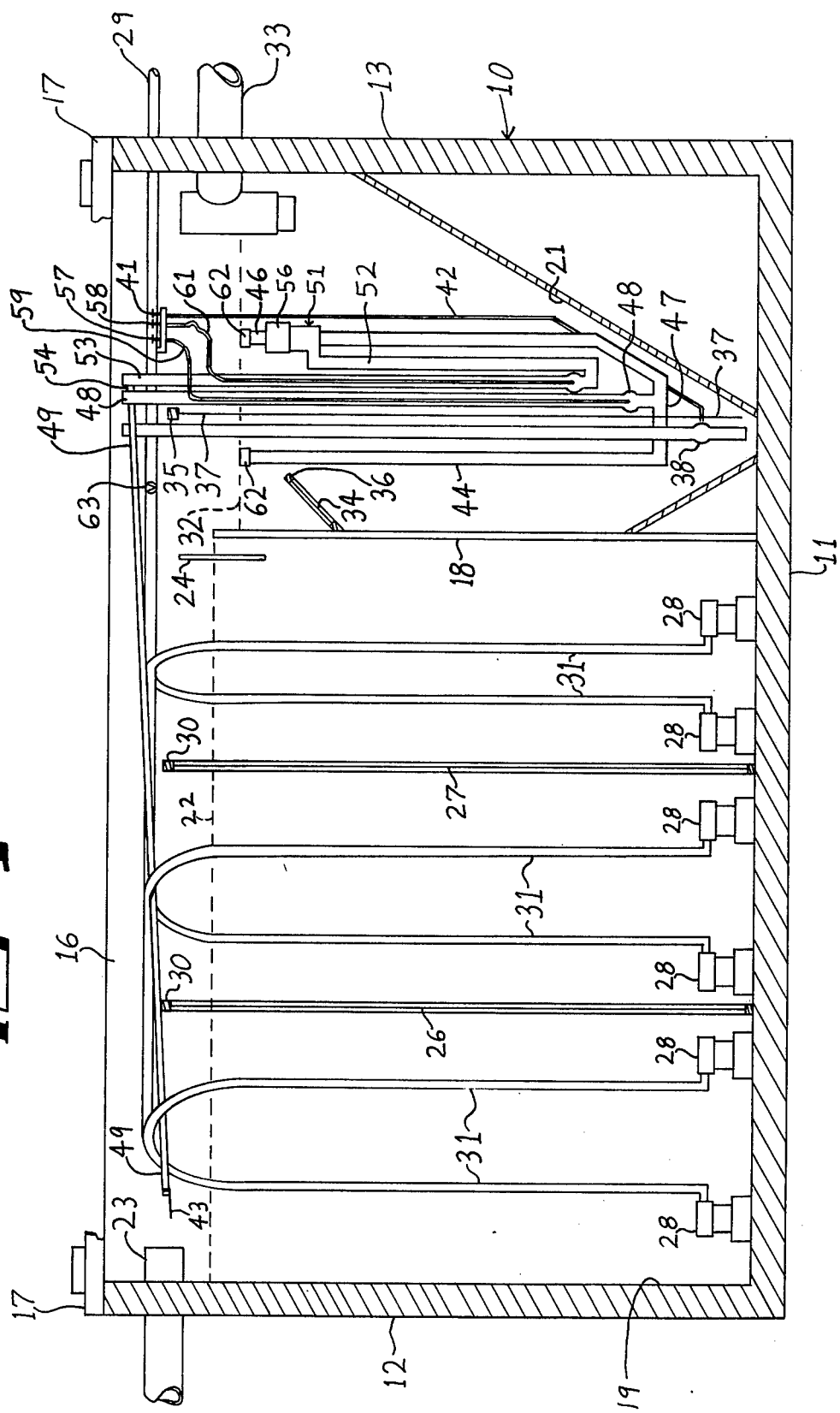
FIG. 1 is a vertical sectional view showing liquid treating apparatus in the form of a converted septic tank employed for use with a single home.

Referring now to the drawings for a better understanding of my invention, I show a conventional 1,000 gallon home septic tank 10 which is modified to include my improved apparatus which converts it into an aerobic treatment unit. While I have shown a converted conventional septic tank for use with a single home, it will be apparent that my improved apparatus may also be associated with systems sized to handle any gallon per day or oxygen demand load. That is, the tank sizes and shapes and the size of the various components of my improved system would be adjusted proportionately; capacities would be adequate to provide for at least 36 hours aeration.

The tank 10 is shown as comprising a bottom wall 11, end walls 12 and 13, and side walls 14 and 16. The tank 10 is covered by a suitable top, a fragment of which is indicated at 17, which prevents debris from entering the tank and also maintains the temperature of the mixed liquor at the highest level. The top 17 must be removable and may be in sections whereby it may be readily removed, especially in the areas over the settling chamber. Also, the top may be vented in the usual manner.

Figure 2:
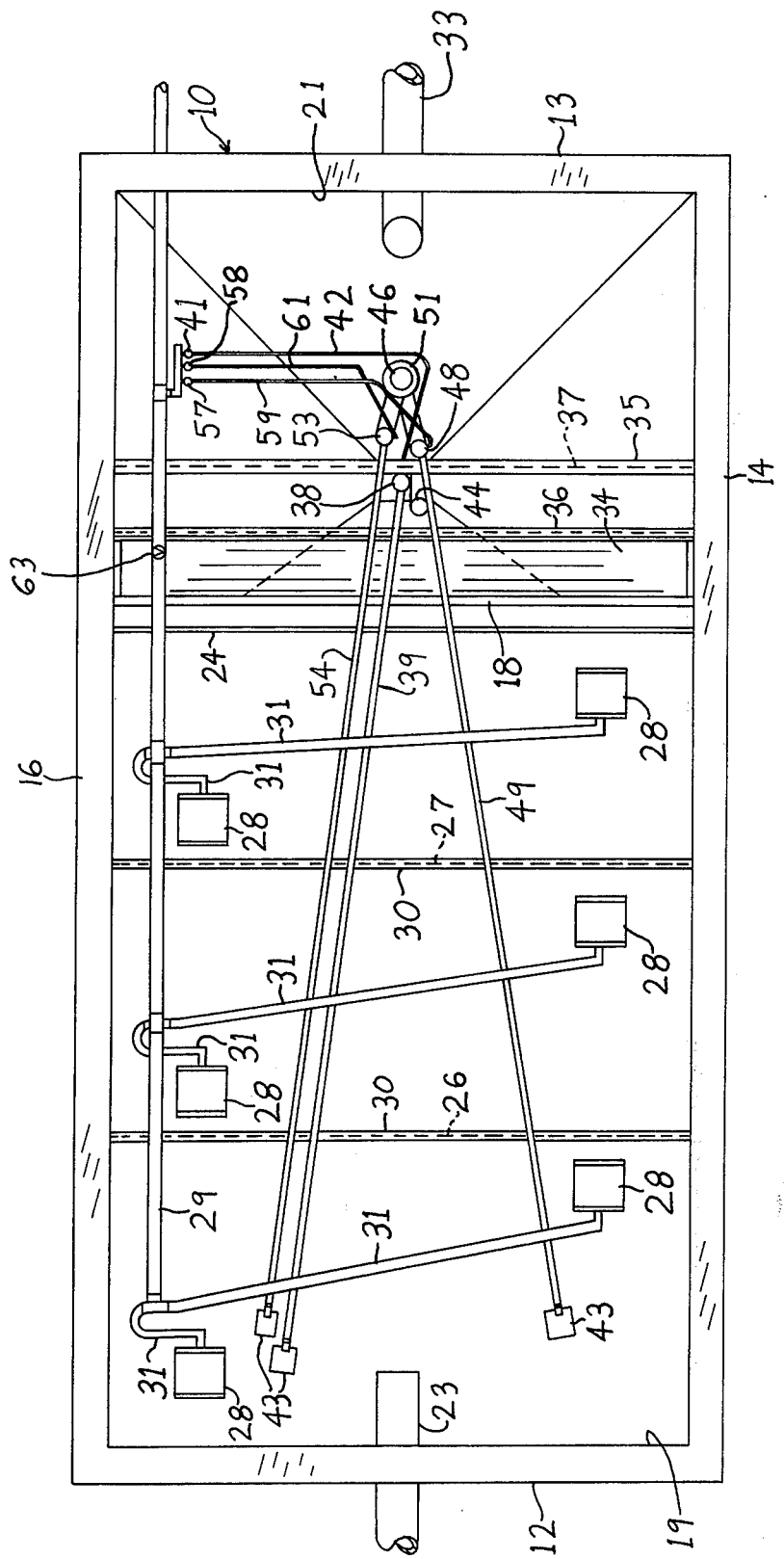
FIG. 2 is a top plan view of the apparatus shown in FIG. 1.

As shown in FIGS. 1 and 2, the tank 10 is provided with an upstanding, imperforate weir or partition 18 which divides the tank 10 into an aeration chamber 19 at the left side of the partition 18 and a settling chamber 21 at the right side of the partition 18. The liquid to be treated, such as waste water, enters the aeration chamber 19 at an elevation above the liquid level, indicated at 22, through an inlet conduit 23 so as to promote splash aeration as the liquid enters the aeration chamber. The liquid flows through the length of the aeration chamber 19 and finally passes over the upper end of the weir or partition 18 to enter the settling chamber 21. A vertical baffle 24 is mounted in the aeration chamber 19 upstream from the partition 18 whereby the liquid flows under the baffle 24 just prior to passing over the partition 18.

Upstanding, permeable retaining members 26 and 27 are mounted in the aeration chamber 19 in longitudinally spaced relation to each other to divide the aeration chamber into three separate compartments. Each retaining member 26 and 27 is of a mesh to permit liquid flow therethrough at a predetermined rate while retaining materials of a selected configuration or size. The retaining members 26 and 27 are formed of a suitable material which is sufficiently immune to the biological and chemical actions of the liquid being treated, such as waste water. Preferably, the retaining members 26 and 27 are formed of a network or fabric, such as synthetic fibers, metal, plastic and the like. The network of materials may be woven, braided, formed by punching out perforations in sheets of metal or plastic or by any method which will provide a network or fabric similar to an arrangement of parallel wires or cords crossed at intervals by each other to leave open spaces of the desired shape and size. The purpose of the retaining devices 26 and 27 is to catch and entrap materials contained in the mixed liquor passing through the aeration chamber. Thus they retain such entrapped materials in place to prevent their passage any further and to expose them in their present configuration to extended biological action until they are metabolized or until their configuration is changed sufficiently for them to be released. Materials so entrapped in turn entrap other materials and also form a base to entrap biological floc or sludge. As the mixed liquor continues to flow through the retaining members 26 and 27 the entrapped materials are continuously exposed to dissolved oxygen thus maintaining an aerobic condition. In the event there is a build-up in an area so heavy that inner materials lose their aerobic condition, the natural reactions caused by anerobes coupled with the liquid movement within the aeration chamber dislodges such materials thereby restoring them to the aerobic environment.

The size of the mesh in the retaining members 26 and 27 is varied to accommodate the nature of the materials which it would be expected to entrap. Each retaining device in sequence would be sized with progressively smaller meshes, as viewed in the direction of travel of the liquid, to insure that no retaining device would become so blocked as to prevent the required rate of flow through the system. However, the smaller the mesh the greater the effectiveness of the retaining member. For example, in municipal systems having large input lines which receive considerable trash, the mesh of the first retaining member could be approximately one foot. This would not only entrap large objects without blocking the flow, but would also catch smaller rags, paper and other debris, thus holding such substances while their characteristics are changed by the biochemical actions and physical flow of the liquid passing relative thereto. This large mesh retaining member would be followed by retaining members each with smaller mesh which is sized to fit the waste load and flow. The object is to provide as quickly as possible retaining devices with the smallest mesh possible which will still permit flow-through at the required rate. In a waste water treatment system of the approximate size shown in FIGS. 1 and 2, a final mesh with openings of approximately 1/16th inch by 1/16th inch are satisfactory. In some situations, the mesh of the retaining members may be much smaller and still permit the required rate of flow by maintaining the liquid level on the downstream side of the retaining member lower than the liquid level on the upstream side thereof to thus create a head.

Retaining members, such as 26 and 27, could be similar to single strands of cord or wire or they could also include depth such as would be achieved by closely layering two or more single strand networks or by providing a honeycomb effect or a nap. The strength and size of the strands in the network would depend upon the materials employed and upon the pressures to which it would be exposed. It is desirable to have the smallest size strands possible to maximize the flow-through area in the retaining member. The retaining devices, such as 26 and 27, are installed to prevent bypass or overflow; they may be fastened in position or may be installed in a frame 30 so that they can be lifted out.

The mixed liquor flowing through the aeration chamber 19 is thoroughly aerated by suitable air delivery devices, such as diffusers 28, which will insure very rapid and thorough mixing of the contents throughout each compartment of the aeration chamber and deliver air or oxygen into the mixed liquor in sufficient quantities to promote the existence of protozoa. Some of the diffusers 28 are positioned so that the water currents created will flow back through the retaining member toward the end wall 12 at the head of the tank 10 thereby transporting bacteria and promoting the blending of both the waste water and the organisms. The diffusers 28 communicate with an air supply line 29 by branch lines 31. Preferably, the branch lines 31 and the supply line 29 are sufficiently flexible or otherwise arranged to permit lifting of the diffusers when desired.

The weir or partition 18 separating the aeration chamber from the settling chamber defines the water level 22 in the aeration chamber while the water level 32 in the settling chamber 21 is determined by the elevation of the outlet conduit 33 which discharges effluent from the settling chamber. Since the water level in the settling chamber 21 rises during times of heavy input into the system, particularly when the outlet 33 is a single pipe, the wier 18 should be high enough to assure that water drops off the upper end of the weir 18 into the settling chamber 21 at all times. As shown in FIGS. 1 and 2, the sides of the settling chamber 21 are sloped to provide an inverted pyramidal shape. However, the settling chamber 21 could assume other shapes, such as an inverted cone, which provides adequate pitch, a smooth surface and a comparatively small bottom area. The settling chamber 21 could be either constructed in the tank 10 or prefabricated and installed therein or it could be an integral part of the tank 10 or a separate tank. It will be apparent that the system could assume other shapes which will suggest themselves to one skilled in the art. For example, the settling chamber could be set in the aeration tank so that mixed liquor in the aeration chamber would surround the settling chamber thus adding to the aeration chamber capacity.

As shown in FIG. 1, a porous deflector member 34 is mounted within the settling chamber 21 subjacent the liquid level therein and adjacent the partition 18 and extends upwardly and inwardly away from the partition 18 into the settling chamber in position to restrain, distract and deflect the downward movement of the liquid discharged over the upper end of the weir or partition 18. The permeable deflector member 34 is shown as being carried by a rectangular frame 36. The permeable deflector 34 is formed of a network made of a similar type material and construction as are the retaining members 26 and 27. The dimensions of the deflector 34 and the size of its mesh are varied to accommodate the rate of flow over the weir 18 and the characteristics of the suspended solids flowing onto it. Usually, the mesh is approximately ⅛th inch by ⅛th inch for a single home tank. Also, the deflector 34 extends the width of the settling tank and for this size system is approximately 6 inches in width. The lower end of the deflector 34 is attached to the adjacent face of the partition or weir 18 sufficiently deep under the water level 32 to assure that the liquid currents coming over the weir 18 will not start to dissipate before they reach the deflector 34 and so that they will also have had sufficient penetration down the weir into the liquid so that as the current is deflected upward the resistance encountered will almost completely stop the outward flow as the currents reach the surface. The deflector member 34 is mounted at an acute angle, as shown, which assures that the deflected currents will be retarded by their contact with the flow coming down along the weir 18 and so that they will break the surface close to the weir 18. This angle may be varied to accommodate the volume of flow over the weir 18. This counter-action flow down the weir 18 and up the deflector 34 slows down the currents whereby suspended solids are stopped by the time they reach the apex and are induced to settle out rapidly. This concentrates the settling directly over the area of the settling tank from which the sludge is removed therefrom in a manner to be described hereinafter. The mesh of the deflector member 34 permits accumulated solids to be forced through it to prevent a buildup of solids within the included angle of the deflector 34 and the weir 18 whereby some of the liquid penetrates the deflector 34 and distracts the currents, thereby reducing both the velocity and the momentum of the flow downward or upward.

Extending transversely of the settling chamber 21 between the weir 18 and the discharge conduit 33 is a permeable restraining member 37 which is also of a mesh to permit liquid flow therethrough in a diffused manner. The upper end of the restraining member 37 extends above the high liquid level in the settling chamber 21 and the lower end thereof terminates adjacent the bottom of the settling tank to divide the settling chamber into two compartments. While I have shown only one restraining member 37, it will be apparent that two or more such restraining devices may be employed to accommodate larger size settling chambers. The restraining member 37 is formed of a suitable network similar to the retaining members 26 and 27 and is provided with a fine mesh. For example, a network having a mesh of approximately 1/16th inch by 1/16th inch is satisfactory. This fine mesh holds back the free flow of the solids, such as floc, which has come over the weir 18 thus influencing their tendency to settle. Entrapped materials build up on the restraining member 37 to thus further restrict the free flow of solids into the next compartment. However, as the buildup increases, it falls off from its own weight. The restraining member 37 thus restrains currents generated in the upstream compartment of the settling chamber and dissipates them as the liquid is enroute to the downstream compartment. However, because of the permeability of the restraining member 37, liquid does pass freely into the downstream compartment as required to replace that lost by effluent discharge through conduit 33 and that loss by recirculation to the aeration compartment to be described hereinafter. Movement of liquid through the restraining member 37 occurs without the generation of currents which prevent settling or hold solids in suspension, as would result where conventional baffle-like members are employed. The restraining member 37 is located relatively close to the weir 18 and is so positioned that it is just beyond the apex of the upward flow from the deflector member 34 and is supported by a suitable frame 35.

The return sludge system consists of one or more conventional suction pumps or aspirator lifts indicated generally at 38 which is connected at its upper end to a discharge line 39. The lift operates continuously and extends from approximately one and one-half inches from the bottom of the settling chamber to an elevation above liquid level to permit gravity flow through the discharge line 39 to a position just above the liquid level at the head of the aeration chamber 19, as shown. Air is fed into the aspirator lift from a suitable source of air under pressure via air control valve 41 which is operatively connected to the aspirator lift 38 by a conduit 42. The size of the suction pump or aspirator lift 38, the air line and the pressure employed are varied to accommodate the flow required and the height of the aspirator lift.

In view of the fact that the pump or aspirator lift are conventional equipment well known in the art to which my invention relates, no further description thereof is deemed necessary. Since the retaining devices 26 and 27 prevent anything except very small solids or floc from passing from the aeration chamber to the settling chamber, my improved sludge system does not have to be designed to prevent clogging. Accordingly, the lift pipe and the sludge return pipe may be relatively small in size, e.g., for a single home unit: ½ inch interior diameter.

A splash plate 43 is mounted at the discharge end of the sludge return conduit 39 in position to receive the liquid discharged therefrom whereby the liquid is spread into a thin sheet and is distributed onto the surface of the liquid in the aeration chamber in a thin film to achieve maximum reaeration. This augments the reaeration which the returning liquid has just received from the aspirator lifts.

Mounted in the settling chamber 21 at opposite sides of the restraining member 37 are upstanding skimmer conduits 44 and 46 which communicate at their lower ends with a common conduit 47 which in turn communicates with a conventional type suction pump or aspirator lift 48. An adjustable slip-on or threaded sleeve 62 is fitted at the top of the skimmer conduit 44 and 46 to permit the exact adjustment of the top to the water level to achieve the required skimming action and volume flow over the lip. The upper end of the lift 48 communicates with a skimmer discharge conduit 49 which is provided with a splash plate 43 which is constructed and operates in the same manner as the splash plate 43 described hereinabove. The lift 48 operates continuously on the same principle as the lift 38. Also, in view of the fact that my improved apparatus eliminates the possibility of the lift and its conduits being clogged such conduits may be of a minimum size. The size of the conduits and the pressure employed are varied to accommodate the height that the material must be lifted, desired skimming action, and also the desired return flow rate. Each skimmer may have its own lift or several skimmer units may be connected to one lift.

Figure 3:
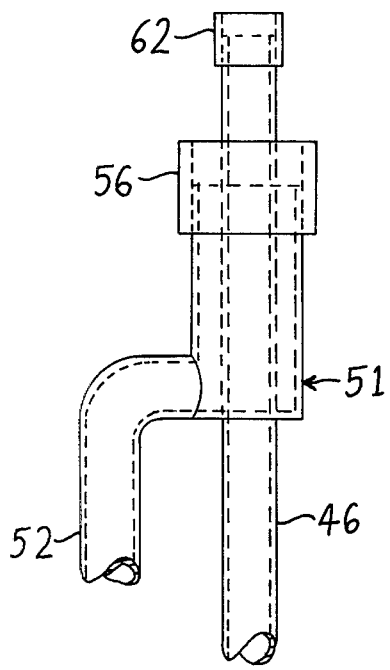
FIG. 3 is a fragmental, side elevational view showing my improved skimmer unit.
Figure 4:
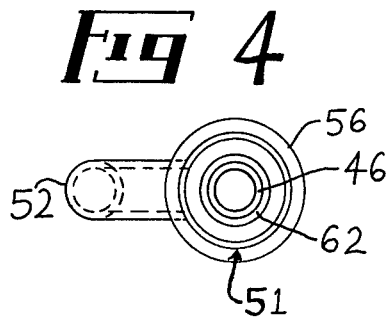
FIG. 4 is a top plan view of the apparatus shown in FIG. 3.
Figure 6:
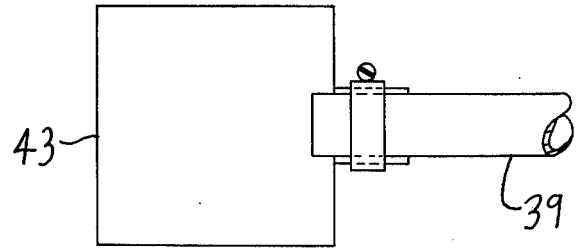
Figure 5:
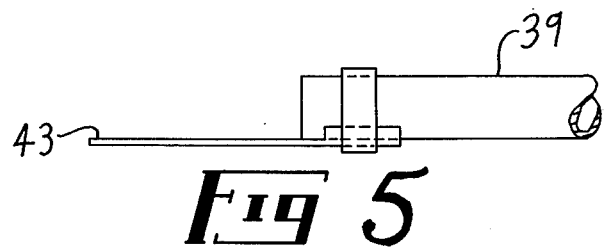
FIG. 5 is a fragmental, side elevational view showing my improved splash plate which is carried by the discharge ends of the sludge return conduits and the skimmer return conduits; and, FIG. 6 is a top plan view of the apparatus shown in FIG. 5.

As shown in FIGS. 3 and 4, a cup-like member 51 surrounds the skimmer conduit 46 with the upper end of the cup-like member being below and spaced from the receiving opening of the skimmer conduit 46 with the inside diameter of the cup-shaped member 51 being slightly larger than the outside diameter of the skimmer conduit 46. Communicating with the cup-like member 51 is a suction conduit 52 which communicates with a pump or aspirator lift 53 which in turn communicates with a suction return conduit 54 having a splash plate 43 connected to the discharge end thereof, as shown. To vary the elevation of the upper end of the cup-like member 51, a slip-on or internally threaded sleeve 56 is in engagement with the upper end of the cup-like member 51 and is adapted for axial movement relative to the cup-like member 51. As with the sludge 38 and skimmer 44 and 46 systems, the pipe and the air pressure are sized to meet the suction desired and to lift; also, the system does not have to be sized to prevent clogging. When more than one skimmer is employed, some may be adjusted for different flow periods. The number and size of the skimmers would vary with the size and shape of the settling compartments and the skimming action desired as well as the desired return flow rate. However, there should always be at least one skimmer for each compartment in the settling chamber which are separated by the restraining device 37.

The skimmer 46 located on the downstream side of the restraining member 37 would always be combined with the adjustable sucker or cup-shaped member 51. The upper end of the sleeve 56 on the duplike member 15 would be set approximately three inches below the top of the skimmer conduit 46. The constant suction thrugh the cup-like member 51 aids the skimmer conduit 46 in pulling floating sludge to it. That is, as the upper end of the skimmer conduit 46 draws the top of the sludge therein the cup-like member 51 also draws the lower portion of the floating sludge into the cup-like member. This keeps away floating sludge mass from being held away from the top of the skimmer conduit 46 by contact with the skimmer pipe. As the sucker or cup-like member 51 draws sludge in from the bottom and the skimmer conduit from the top the combined action disintegrates the sludge, increasing its susceptibility to being taken in by either device. Usually, it is not necessary to position the cup-like skimmer 51 on the skimmer conduit 44 in the compartment at the upstream side of the restraining device 37 since the clumps of floating sludge which come to the surface in that area are either taken in by the skimmer conduit 44 or are drawn over the weir 18 to be disintegrated by the liquid flow against the weir 18. As shown in FIGS. 1 and 2, air control valves 57 and 58 introduce air into the aspirator lifts 48 and 53 through conduits 59 and 61, respectively. Also, air valve 63 is employed to regulate the flow of air to the air diffusers 28. Air is supplied from a pump or compressor located outside the tank.

The combined rate of flow of the return sludge and skimmer systems back to the aeration chamber will be equal to at least 300% of the incoming flow to assure maximum retention of sludge and other organisms, as well as dissolved oxygen in the settling chamber adequate to support protozoa and other higher forms or organisms.

The treated effluent leaves the settling chamber via a baffled outlet, designed to permit rapid outflow with minimum increase in water level in the settling chamber. As required, discharged effluent will receive additional aeration or disinfection subsequent to leaving the settling chamber.

From the foregoing, it will be seen that I have devised improved apparatus for treating liquid, such as wastewater, which is simple in construction and economical to install whether done by converting an existing septic tank or by using a specially constructed tank, sized to fit the load to be handled. I provide for a maximum return of the settled sludge and floatable materials from the settling chamber to the aeration chamber thus increasing available food supply during short or extended low feed periods and protecting the integrity of the primary biological family. My apparatus eliminates the need for comminutors and yet completely prevents other than very fine solids or floc from entering the settling chamber. It assures a strong mixed liquor with maximum retention of bacteria as well as accelerates the rate of mixing and blending of incoming liquid, mixed liquor and return sludge to promote biological actions and eliminate adverse effects of shock loading. Furthermore, my apparatus is adapted to metabolize both solid materials and components of the waste which require extensive periods of oxidation by providing retaining devices, high return sludge rates and long holding periods. It improves the means for returning sludge and skimmed materials to provide increased aeration of the returning liquid. To assure accelerated settling of sludge I provide a porous deflector, and I maximize quiescence in the discharge area of the settling chamber by providing the restraining member 37 which divides the settling chamber into separate compartments with the settled sludge being removed adjacent to the bottom of the compartments and with any rising sludge being collected by my improved surface/-sub-surface skimmer.

The improved effects of the combination of the deflector member 34 and the retaining devices 26 and 27 and restraining device 37 is to reduce materially the suspended solids which reach the discharge point in the system and to eliminate currents which keep solids in suspension in the settling chamber. This combination also results in a reduction in settling time and in the surface area required for the settling chamber which all results in reduced gallon capacity requirements in the settling chamber in terms of influent to the system. This combination also permits a very high percentage recirculation of sludge skimmed products and liquid of at least 300% on a constant basis, which in turn results in a constant flow into the settling chamber, thus maintaining a high dissolved oxygen rate.

This high dissolved oxygen level maintained in the settling chamber because of rapid recirculation of the liquid made possible by the use of my improved retaining, deflecting, and restraining members, maintains an environment which supports both aerobic bacteria and predators such as protozoa and rotifers. Accordingly, septicity is prevented, oxidation of materials is continued and the predators reduce bacteria population, including pathogens, which clarifies the effluent and stimulates maximum bacteria growth. Furthermore, nitrification is extended and some dentrification is accomplished. Thus, the discharged effluent is very low in biochemical oxygen demand and suspended solids and high in dissolved oxygen.

The use of individual parts of my total system, such as the retaining device 26 and 27, the deflecting device 34, the restraining device 37, the combined skimmer-sucker 46 and 51, or the splash plate 43, either in some combinations or separately, will also enhance the effectiveness of other types of aerobic treatment systems, by adapting the configuration of the device to that of the particular system.

Also, the use of the retaining device 26/27 in a septic tank will upgrade the effectiveness of the tank so that it could save owners the labor and cost of having to dig up or replace tile lines. A suitable retaining device with a fairly fine mesh may be placed in the tank a few inches in front of the discharge outlet to retain grease, hair and fine particles of paper and the like and also to entrap smaller suspended particles. These materials would all be held intact so that they would not pass into the tile lines. If the tank became so full that it completely clogs the mesh, this would be a notice to have the tank cleaned, thus eliminating the possibility of having passed materials which clog the tile lines.

While I have shown my invention in but one form, it will be obvious to those skilled in the art that it is not so limited but is susceptible of various changes and modifications without departing from the spirit thereof.

What I claim is:
1. Liquid treating apparatus comprising:
   a. an aeration chamber having an inlet for receiving the liquid to be treated and an outlet for discharging said liquid from said aeration chamber,
   b. means of aerating said liquid in said aeration chamber,
   c. a settling chamber having an inlet passageway and a discharge passageway in spaced relation to each other with said inlet passageway in communication with said outlet of said aeration chamber,
   d. at least one permeable restraining member in said settling chamber of a fine mesh which restrains and dissipates currents yet permits liquid flow therethrough in a diffused manner and extending over substantially the entire cross-section of said settling chamber, between said inlet passageway and said discharge passageway with the upper end of said restraining member extending above the high liquid level in said settling chamber and the lower end thereof terminating adjacent the bottom of said settling chamber and dividing said settling chamber into at least two compartments, and e. sediment transfer means communicating with said settling chamber adjacent to the bottom thereof between said inlet passageway and said restraining member for transferring sediment from said settling chamber.

2. Liquid treating apparatus as defined in claim 1 in which said sediment transfer means communicates with said aeration chamber.

3. Liquid treating apparatus as defined in claim 1 in which said settling chamber is provided with downwardly converging side walls.

4. Liquid treating apparatus comprising:
a. An aeration chamber having an inlet for receiving the liquid to be treated and an outlet for discharging said liquid from said aeration chamber.
b. means for aerating said liquid in said aeration chamber.
c. a settling chamber having an inlet passageway and a discharge passageway in spaced relation to each other with said inlet passageway in communication with said outlet of said aeration chamber.
d. sediment transfer means communicating with said settling chamber adjacent to the bottom thereof between said inlet passageway and said discharge passageway for transferring sediment from said settling chamber, and
e. at least one permeable retaining member in said aeration chamber between said inlet and said outlet and extending over substantially the entire cross-section of said aeration chamber to divide said aeration chamber into at least two compartments with said retaining member being of a mesh sized to only catch, trap and retain materials of a desired composition or configuration or organisms yet permit liquid flow therethrough at a predetermined rate.

5. Liquid treating apparatus as defined in claim 4 in which said means, for aerating comprises air diffusers mounted in said compartments in said aeration chamber.

6. Liquid treating apparatus as defined in claim 4 in which at least one return conduit communicating at its receiving end with said settling chamber with the discharge end of said return conduit extending into said aeration chamber and terminating above the liquid level in said aeration chamber has a relatively flat plate mounted subjacent the discharge end of the said return conduit and extending forwardly thereof generally parallel to the surface of the liquid in said aeration chamber so that the effluent from said return conduit is spread into a thin sheet prior to falling onto the surface of the liquid in the aeration chamber.

7. Liquid treating apparatus comprising:
a. an aeration chamber having an inlet for receiving the liquid to be treated and spaced from the discharge end of said aeration chamber.
b. means aerating said liquid in said aeration chamber,
c. a settling chamber having an inlet passageway in communication with said aeration chamber for receiving said liquid discharged from said aeration chamber and defining a weir over which the liquid flows,
d. a discharge passageway for said settling chamber at an elevation below the upper end of said weir defining a liquid level in said settling chamber below said upper end, and
e. a permeable deflection member being of a close mesh mounted in said settling chamber subjacent the liquid level therein and adjacent said weir and extending upwardly and away from said weir in position to restrain, distract, and deflect downward movement of said liquid discharged over said upper end of said weir.

8. Liquid treating apparatus comprising:
a. an areation chamber having an inlet for receiving the liquid to be treated and an outlet for discharging said liquid from said aeration chamber,
b. means of aerating said liquid in said aeration chamber,
c. a settling chamber having an inlet passageway and a discharge passageway in spaced relation to each other with said inlet passageway in communication with said outlet of said aeration chamber and defining a weir over which the liquid flows,
d. an upstanding, suction operated skimmer conduit in said settling chamber having a receiving opening adjacent the liquid level in said settling chamber,
e. a cup-like member surrounding said skimmer conduit with the upper end of said cup-like member being below and spaced from said receiving opening of said skimmer conduit, and
f. a suction conduit communicating with said cup-like member to provide a suction operated skimmer below the liquid level in said settling chamber.

9. Liquid treating apparatus as defined in claim 8 in which said skimmer conduit and said suction pipe communicate with said aeration chamber for transferring skimmed materials thereto.

10. Liquid treating apparatus as defined in claim 8 in which said cup-like member is adjustable in length to vary the elevation of the upper end of said cup-like member.

11. Liquid treating apparatus as defined in claim 8 in which a sleeve-like member is in engagement with the upper portion of said cup-like member and is adapted for axial movement relative thereto to selected elevations.

12. Liquid treating apparatus as defined in claim 8 in which an adjustable sleeve is mounted on the upper portion of said skimmer conduit and is adapted for axial movement relative thereto to vary the elevation of the upper end of said skimmer conduit.

* * * * *

UNITED STATES PATENT OFFICE
CERTIFICATE OF CORRECTION

Patent No. 4,006,085         Dated February 1, 1977

Inventor(s) Orval R. Matteson

It is certified that error appears in the above-identified patent and that said Letters Patent are hereby corrected as shown below:

Column 1, line 51, "now" should read -- not --.

Column 2, line 34, "on" should read -- in --.

Column 8, line 42, "to" should read -- the --.

Column 8, line 56, "15" should read -- 51 --.

Column 8, line 63, "away" should read -- any --.

Column 9, line 7, after "over" insert -- to --.

Signed and Sealed this

Thirty-first Day of May 1977

[SEAL]

Attest:

RUTH C. MASON
Attesting Officer

C. MARSHALL DANN
Commissioner of Patents and Trademarks